(12) United States Patent
Wang et al.

(10) Patent No.: US 8,872,913 B2
(45) Date of Patent: Oct. 28, 2014

(54) SYSTEM FOR POSITIONING MICRO TOOL OF MICRO MACHINE AND METHOD THEREOF

(75) Inventors: Shih-Ming Wang, Tao-Yuan (TW);
Chia-You Chung, Tao-Yuan (TW);
Chih-Chun Lin, Tao-Yuan (TW)

(73) Assignee: Chung Yuan Christian University, Tao-Yuan (TW)

( * ) Notice: Subject to any disclaimer, the term of this patent is extended or adjusted under 35 U.S.C. 154(b) by 771 days.

(21) Appl. No.: 12/686,943

(22) Filed: Jan. 13, 2010

(65) Prior Publication Data

US 2011/0228050 A1 Sep. 22, 2011

(30) Foreign Application Priority Data

Jan. 13, 2009 (TW) .............................. 98101087 A

(51) Int. Cl.
*H04N 13/02* (2006.01)
*G05B 19/401* (2006.01)
*G06T 7/00* (2006.01)
*B23Q 15/00* (2006.01)

(52) U.S. Cl.
CPC .......... *G06T 7/0042* (2013.01); *G05B 19/4015* (2013.01); *G06T 2207/10012* (2013.01); *G06T 2207/30164* (2013.01)
USPC ................................................ 348/95; 229/9

(58) Field of Classification Search
USPC ........................................................... 348/95
See application file for complete search history.

(56) References Cited

U.S. PATENT DOCUMENTS

| | | | |
|---|---|---|---|
| 6,516,990 B2* | 2/2003 | Hess et al. ...................... 228/4.5 |
| 6,955,284 B2* | 10/2005 | Zakel et al. ....................... 228/9 |
| 7,545,906 B2* | 6/2009 | Xie et al. ......................... 378/25 |
| 2008/0273807 A1* | 11/2008 | Dauw et al. ................... 382/237 |

* cited by examiner

*Primary Examiner* — Behrooz Senfi
*Assistant Examiner* — Mohammed Jebari
(74) *Attorney, Agent, or Firm* — WPAT, PC; Justin King

(57) ABSTRACT

The present invention discloses a system for positioning micro tool of micro machine is provided in this invention, wherein the system comprises a stereo-photographing device, an image analysis system, a PC-based controller, and a micro machine. The image analysis system can analyze position of the micro tool of the micro machine and work piece by using algorithm, and the micro tool is then positioned to a pre-determined location. A method for positioning micro tool of the micro machine is also provided in this invention.

21 Claims, 7 Drawing Sheets

SYSTEM FOR POSITIONING MICRO TOOL OF MICRO MACHINE AND METHOD THEREOF

BACKGROUND OF THE INVENTION

1. Field of the Invention

The present invention is generally related to a positioning system and method thereof, and more particularly to a system for positioning micro tool of a micro machine and method thereof.

2. Description of the Prior Art

With technological product worldwide moving to compact, ultra precision development, it is an increasing trend for the requirement of micro precision manufacture for 3C industry, optoelectronic device, semiconductor manufactures, communication industry, precision mould manufactures, and precision component manufactures.

Miniature manufacturing technology nowadays utilizes micro electronic device manufacturing technology that develops micro electromechanical systems (MEMS). Nevertheless, the MEMS technology shall be suitable for processing 2-2.5D geometrical outline, and relative processing precision (size tolerance/workpiece size) of that is about $10^{-1} \sim 10^{-2}$ mm. For relative precision close to or larger than $10^{-3} \sim 10^{-5}$ mm of larger processing mould, as well as complicated 3D miniature product, there is no solution or technology to meet such a requirement. Another bottleneck is that MEMS technology can not be applied to metal material or other diverse material. On the other hand, although nano-scale processing usually utilizes STM or AFM, they are low cycle time and immature. Hence, although MEMS technology (such as LIGA technology) developed tolerable application, miniature industrial component manufacturing method still using traditional mechanical processing, moulding, EDM, or LASER processing. Therefore, development of Non-MEMS miniature processing technology is a mainstream in worldwide study and research, which utilizes traditional mechanical processing, by means of miniature design and equipment, with meso-/micro-scale processing technology to approach precision processing. After such this field being continuously and extensively developed, it may exceed limit of MEMS technology, and applied to processing diverse metal material to extend to various industrial applications.

There are many savants and researchers worldwide devote themselves to study of precision research now. However, due to miniature precision processing, equipment for precision processing still needs considerable improvement in precision. Besides equipment design should keep in definite range, differing to medium or large size processing, requirement of processing precision is elevated while equipment size is minimized, even under the same relative processing precision (size tolerance/workpiece size) requirement. Therefore, besides precision to processing equipment per se, factors of precision processing, such as positioning deviation of a micro tool (diameter less than 0.1 mm) prior processing, deflection variation of the micro tool in processing, and vibration of the micro tool, are not ignored. Minimized micro tool and workpiece will incur increase of position difficulty. Micro workpiece shall incur position deviation while transferred by robot arm or manpower, or mounted on machine by jig. If such deviation can not be corrected, this will cause initial positioning error between micro tool and processing origin point of the workpiece, and processing precision can not be kept in standard requirement.

Generally speaking, initial processing error can be minimized by precisely positioning micro tool. While in processing, the error shall deviate the micro tool from theoretical processing position, and amount of deviation will depends on theoretical position. In order to diminish such positioning error, in conventional processing, operators must use tool to touch the workpiece in order to confirm relative position, and then continue to processing. Nevertheless in precision processing, due to volume and shape of a workpiece are tiny, the above mentioned issue can not be resolved by using conventional method. Besides, due to tiny micro tool, it is impossible and causes micro tool broken that relative position between micro tool and workpiece is positioned by using the micro tool contacting the workpiece. According to the above description, research points for promoting precision of precision processing may focus on examining positioning deviation between micro tool and workpiece before processing, correcting such a deviation, and automatically and exactly positioning micro tool to theoretical position on workpiece. Hence, development of positioning system for micro tool of micro machine is a critical objective in micro manufacturing industry. Besides, micro tool is easy deformable, difficult mountable, and unavoidable generating positioning deviation on assembly and detachment to micro machine, the positioning system needs in-line inspection, non-contacting, and low cost in considering applicable to industry. Many efforts have been devoted to research and development of precision processing equipment nowadays, but seldom report including all three characters to upgrade micro milling/drilling precision is reported. This invention will inspect positioning deviation of a micro tool, with automatic function of positioning the micro tool to correct position error, such that micro tool can be placed immediately and exactly on the theoretical location, and applied to precision processing industry.

SUMMARY OF THE INVENTION

One object of the present invention is to use mechanical vision theory, deviation offset, and coordination transfer theory to develop a system and method for positioning micro tool of a micro machine. Therefore, this present invention does have the economic advantages for industrial applications. The micro tool in present invention can be not only inspected positioning deviation, but also corrected to offset that deviation. Humane resources and time for calibrating the micro tool can be saved before micro machine is processing in this invention.

Another object of the present invention is to provide a positioning system and method with in-line inspection.

Still another object of the present invention is to provide a positioning system and method with deviation offset function.

Another object of the present invention is to provide a low-cost positioning system and method.

Accordingly, the present invention discloses a system for positioning micro tool of a micro machine comprising a first image capturing device and a second image capturing device for capturing horizontal and vertical images of that micro tool and a workpiece, and a positioning device which includes an image input interface for receiving the horizontal and vertical images of the micro tool and the workpiece captured by the first image capturing device and the second image capturing device, means for analyzing image edge of the horizontal and vertical images of the micro tool and the workpiece into border horizontal and vertical images of the micro tool and the workpiece, means for analyzing relative allocation of the border horizontal and vertical images of the micro tool and the workpiece into location discrepancies of the micro tool and the workpiece, and an output interface for transferring out the location discrepancies of the micro tool and the workpiece. A controller for receiving data of the location discrepancies of the micro tool and the workpiece to position the micro tool into precise location is also included in the system for positioning micro tool of the micro machine.

A positioning system comprises a micro machine, a stereo image capturing device, a positioning device, and a controller. The micro machine includes a micro tool for processing a precision working to a workpiece, a platform for providing a base to processing said workpiece, and a precision arm for controlling a position of said micro tool. The stereo image capturing device is for capturing a stereo image of said micro tool and said workpiece. The positioning device includes an image input interface for receiving said stereo images of said micro tool and said workpiece, means for analyzing image edge of said stereo images of said micro tool and said workpiece into border images of said micro tool and said workpiece, means for analyzing relative allocation of said border images of said micro tool and said workpiece into location discrepancies of said micro tool and said workpiece, and an output interface for transferring out said location discrepancies of said micro tool and said workpiece. The controller is for receiving data of said location discrepancies of said micro tool and said workpiece to position said micro tool into precise location.

A positioning method comprises a step of providing a stereo image capturing device, a step of providing a tip of a micro tool and a workpiece into a vision of said stereo image capturing device, a step of capturing images of said micro tool and said workpiece by using said stereo image capturing device, a step of analyzing borders in said images of said micro tool and said workpiece, a step of calculating positions of said micro tool and said workpiece according to said borders in said images of said micro tool and said workpiece, a step of calculating a deviation of said micro tool, and a step of positioning said micro tool.

A position deviation detecting method for micro tool of a micro machine comprises a step of providing a stereo image capturing device, and a step of providing a tip of said micro tool and a workpiece into a vision of said stereo image capturing device. Then, images of said micro tool and said workpiece are captured by using said stereo image capturing device. Next, borders in said images of said micro tool and said workpiece are analyzed. Further, positions of said micro tool and said workpiece are calculated according to said borders in said images of said micro tool and said workpiece. Moreover, a deviation of said micro tool is then calculated.

DESCRIPTION OF THE PREFERRED EMBODIMENTS

Figure 1:
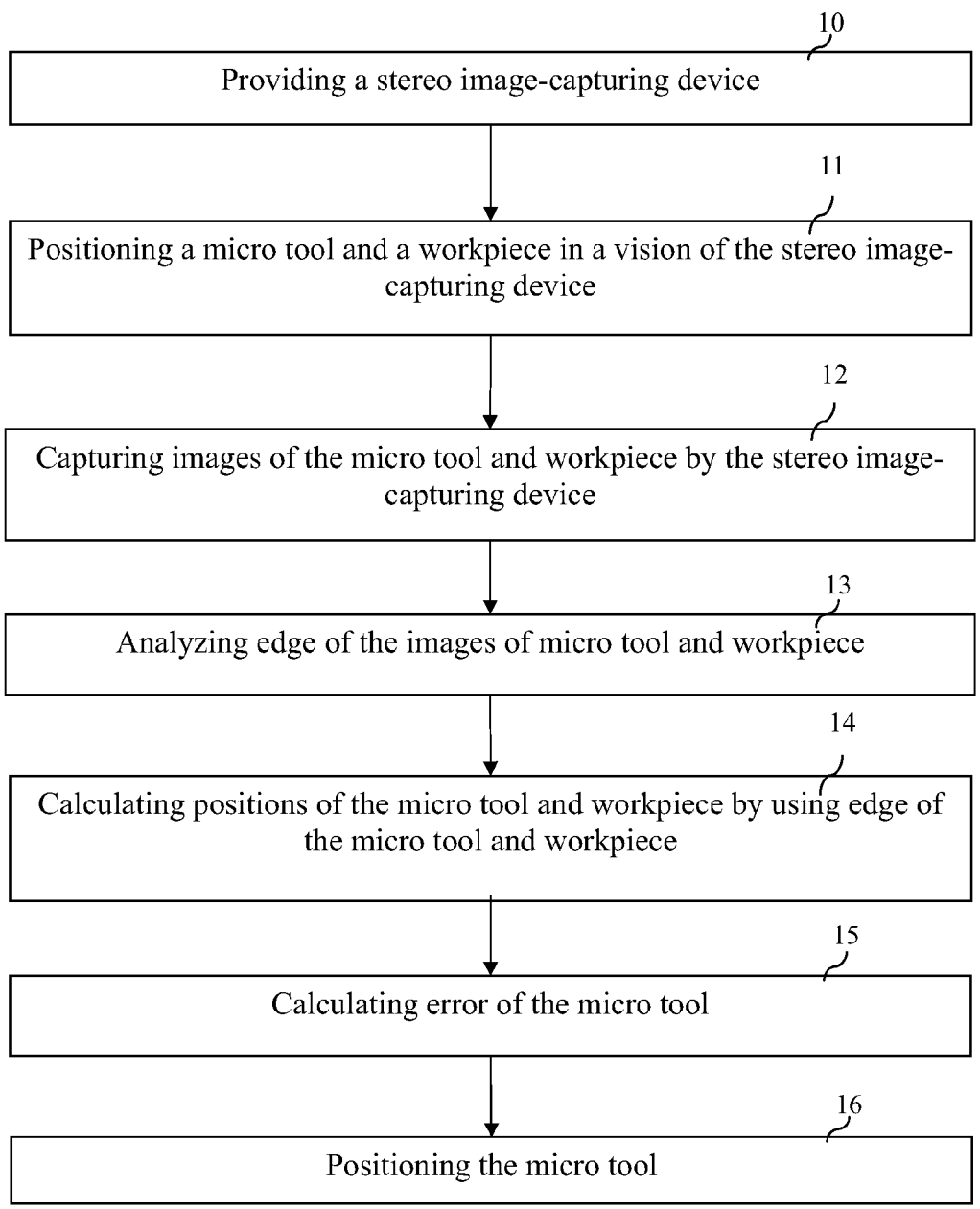
FIG. 1 shows one preferred embodiment flow diagram of a method for positioning a micro tool of a micro machine in accordance with present invention.

What is probed into the invention is a positioning system and method. Detail descriptions of the structure and elements will be provided in the following in order to make the invention thoroughly understood. Obviously, the application of the invention is not confined to specific details familiar to those who are skilled in the art. On the other hand, the common structures and elements that are known to everyone are not described in details to avoid unnecessary limits of the invention.

In this invention, two discrete cameras are mounted at front side and lateral side of a micro machine for capturing real-time images of a micro tool and workpiece to analyze borders thereof. Positioning deviation of the micro tool can be obtained by using detected positions of the micro tool and the workpiece. The positioning deviation will be transferred by coordinate transformation to error correction NC code, such that the micro tool can be located to initial milling or drilling position on the workpiece, and then process.

Because non-contacting positioning method is used, this invention can obtain advantages of (1) surface position of the workpiece being images captured without probe correction; (2) fast determining position without using probe to contact point-to-point; and (3) soft, thin, or other non-contactable micro workpiece can being detected without constraint of size and shape.

Accordingly, the present invention discloses a system for positioning micro tool of a micro machine comprising a first image capturing device and a second image capturing device for capturing horizontal and vertical images of that micro tool and a workpiece, and a positioning device which includes an image input interface for receiving the horizontal and vertical images of the micro tool and the workpiece captured by the first image capturing device and the second image capturing device, means for analyzing image edge of the horizontal and vertical images of the micro tool and the workpiece into border horizontal and vertical images of the micro tool and the workpiece, means for analyzing relative allocation of the border horizontal and vertical images of the micro tool and the workpiece into location discrepancies of the micro tool and the workpiece, and an output interface for transferring out the location discrepancies of the micro tool and the workpiece. A controller for receiving data of the location discrepancies of the micro tool and the workpiece to position the micro tool into precise location is also included in the system for positioning micro tool of the micro machine.

The means for analyzing image edge can be Sobel edge detection method, Laplace of Gaussian edge detection method, or Canny edge detection method, and preferred is to use Canny algorithm to calculate edge of the micro tool and said workpiece. The means for analyzing relative allocation comprises steps of calculating vertical pixel discrepancy of said micro tool tip to a processing point of the workpiece, calculating horizontal pixel discrepancy of said micro tool center point to the processing point of the workpiece, and transferring pixel unit of said vertical and horizontal pixel discrepancies into length unit to obtain locational discrepancies from said micro tool to the workpiece. Resolutions of said first and second image capturing devices are calibrated before capturing said horizontal and vertical images.

A positioning system comprises a micro machine, a stereo image capturing device, a positioning device, and a controller. The micro machine includes a micro tool for processing a precision working to a workpiece, a platform for providing a base to processing said workpiece, and a precision arm for controlling a position of said micro tool. The stereo image capturing device is for capturing a stereo image of said micro tool and said workpiece. The positioning device includes an image input interface for receiving said stereo images of said micro tool and said workpiece, means for analyzing image edge of said stereo images of said micro tool and said workpiece into border images of said micro tool and said workpiece, means for analyzing relative allocation of said border images of said micro tool and said workpiece into location discrepancies of said micro tool and said workpiece, and an output interface for transferring out said location discrepancies of said micro tool and said workpiece. The controller is for receiving data of said location discrepancies of said micro tool and said workpiece to position said micro tool into precise location.

The means for analyzing image edge can be Sobel edge detection method, Laplace of Gaussian edge detection method, or Canny edge detection method, and preferred is to use Canny algorithm to calculate edge of the micro tool and said workpiece. The means for analyzing relative allocation comprises steps of calculating vertical pixel discrepancy of said micro tool tip to a processing point of the workpiece, calculating horizontal pixel discrepancy of said micro tool center point to the processing point of the workpiece, and transferring pixel unit of said vertical and horizontal pixel discrepancies into length unit to obtain locational discrepancies from said micro tool to the workpiece. The stereo image capturing device comprises a first image capturing device and a second image capturing device, and the stereo images include horizontal and vertical images. Resolutions of said first and second image capturing devices are calibrated before capturing said horizontal and vertical images.

A positioning method provided herein comprises a step of providing a stereo image capturing device, a step of providing a tip of a micro tool and a workpiece into a vision of said stereo image capturing device, a step of capturing images of said micro tool and said workpiece by using said stereo image capturing device, a step of analyzing borders in said images of said micro tool and said workpiece, a step of calculating positions of said micro tool and said workpiece according to said borders in said images of said micro tool and said workpiece, a step of calculating a deviation of said micro tool, and a step of positioning said micro tool.

A position deviation detecting method for micro tool of a micro machine provided herein comprises a step of providing a stereo image capturing device, and a step of providing a tip of said micro tool and a workpiece into a vision of said stereo image capturing device. Then, images of said micro tool and said workpiece are captured by using said stereo image capturing device. Next, borders in said images of said micro tool and said workpiece are analyzed. Further, positions of said micro tool and said workpiece are calculated according to said borders in said images of said micro tool and said workpiece. Moreover, a deviation of said micro tool is then calculated.

The stereo image capturing device comprises a first image capturing device and a second image capturing device for capturing horizontal and vertical images of the micro tool and the workpiece, and resolutions thereof can be calibrated before images are captured. The first image capturing device and the second image capturing device can be CCD or CMOS digital camera. The step of analyzing the borders in the images of the micro tool and the workpiece comprises Sobel edge detection method, Laplace of Guassian edge detection method, or Canny detection method, and a preferred step is Canny edge detection method. The step of calculating the positions of the micro tool and the workpiece comprises a step of calculating vertical pixel discrepancy of the micro tool tip to a processing point of the workpiece, and a step of calculating horizontal pixel discrepancy of the micro tool center point to the processing point of the workpiece. The step of calculating the deviation of the micro tool comprises transferring pixel unit of the vertical and horizontal pixel discrepancies into length unit to obtain locational discrepancies from the micro tool to the workpiece.

An in-line micro tool positioning method of this invention can detect distance between edges of workpiece's two axes and tip of micro tool, by using individual twin-lens reflective cameras to capture real-time images, and then horizontal position of the micro tool is located. The micro tool's stereo position is therefore located by using distance between tip of the micro tool and workpiece edge location to position vertical height. A manufacture coordinate system of the workpiece can be corrected according to the detected result. When the micro tool has positioning error, due to NC code is compiled according to the manufacture coordinate system of the workpiece in processing, it should be corrected. Hence, the manufacture coordinate system of the workpiece can be corrected by using automatic micro tool positioning system to eliminate micro tool's positioning error, and manufacture precision is then enhanced.

After the workpiece images are captured by image-capturing device, profile of the workpiece is then calculated by using image-processing method. Canny edge detection method is preferred in this invention for detect real workpiece profile due to low signal-to-noise, thinner edge, and continuity. Unit of the detected real workpiece profile is pixel, so length of edge profile should be transferred to pixel unit. Image resolution should be checked according to calibration, and calculated distance of error according to captured image resolution is transferred from the pixel unit into length unit. The error with transferred unit is location discrepancy of the micro tool in manufacture environment and is corrected by using NC code. A flow chart of the in-line position micro tool method described above is shown in FIG. 1.

As shown in FIG. 1, a stereo image capturing device is provided (step 10). The stereo image capturing device has two or more than two image-capturing devices to capture two or more than two images of an article from different positions and/or angles. The image-capturing devices in this invention are preferred digital cameras, regardless of CCD or CMOS digital camera, or SLR (single lens reflective) or TLR (twin lens reflective) cameras. A micro tool and workpiece are then positioned in a field of vision of the stereo image-capturing device (step 11). Next, images of the micro tool and the workpiece are captured by the stereo image-capturing device (step 12). A calibration step should be performed to the stereo image-capturing device before the step 12 to obtain image resolution. Then, edge images of the micro tool and workpiece are analyzed by using algorithm (step 13), wherein the algorithm is Canny edge detection method. Relative positions between the micro tool and the workpiece are analyzed according to the edges thereof (step 14), wherein the relative positions include horizontal position of the micro tool and height difference. Next, error of the micro tool is calculated (step 15), wherein horizontal position and height difference between centre point of the micro tool and processing point of the workpiece are calculated and pixel unit is transferred into length unit. Then, this error data is transferred into NC code to locate the micro tool (step 16).

The step 13 to step 15 are calculated in a computer and to control the micro tool by using a PC-based controller. When the stereo image-capturing device captured images of the micro tool and the workpiece (as shown in step 12 of FIG. 1), data is transferred to positioning micro tool system. In this invention, the micro tool positioning system is to compile algorithm to program, such that output data from the stereo image-capturing device can be analyzed and processed. The algorithm includes Canny edge detection method, analyzing pixel differences between the micro tool and original processing point of the workpiece method, transferring the pixel difference into length method, and transferring the length into NC code with .txt file method (as shown from steps 13 to 15 in FIG. 1). And the transferred NC code is then delivered to the PC-based controller and the micro tool of micro machine is positioned directly into location.

In this invention, the micro machine can be a toggle machine, which can be referred to a Taiwan patent application with application number 095117612, title is "TOGGLE-TYPE POSITIONING PLATFORM AND TOGGLE-TYPE MACHINE CENTER" invented by Shih-Ming Wang and Chih-Peng Yang and applied by CYCU.

In this invention, inspection of the micro tool positioning error is, by using a stereo image-capturing device, which can be separate TLR cameras equipped on forward and lateral direction of a machine, to perform edge detection from real-time captured images of the micro tool and workpiece. Positioning error of the micro tool can be obtained from detected positions of the micro tool and workpiece. This error is then through coordinate transformation into NC code. This NC code is then output to PC-based controller to locate the micro tool moving fast and exactly to initial stage and processing. Detailed process can be referred to FIG. 2.

Figure 2:
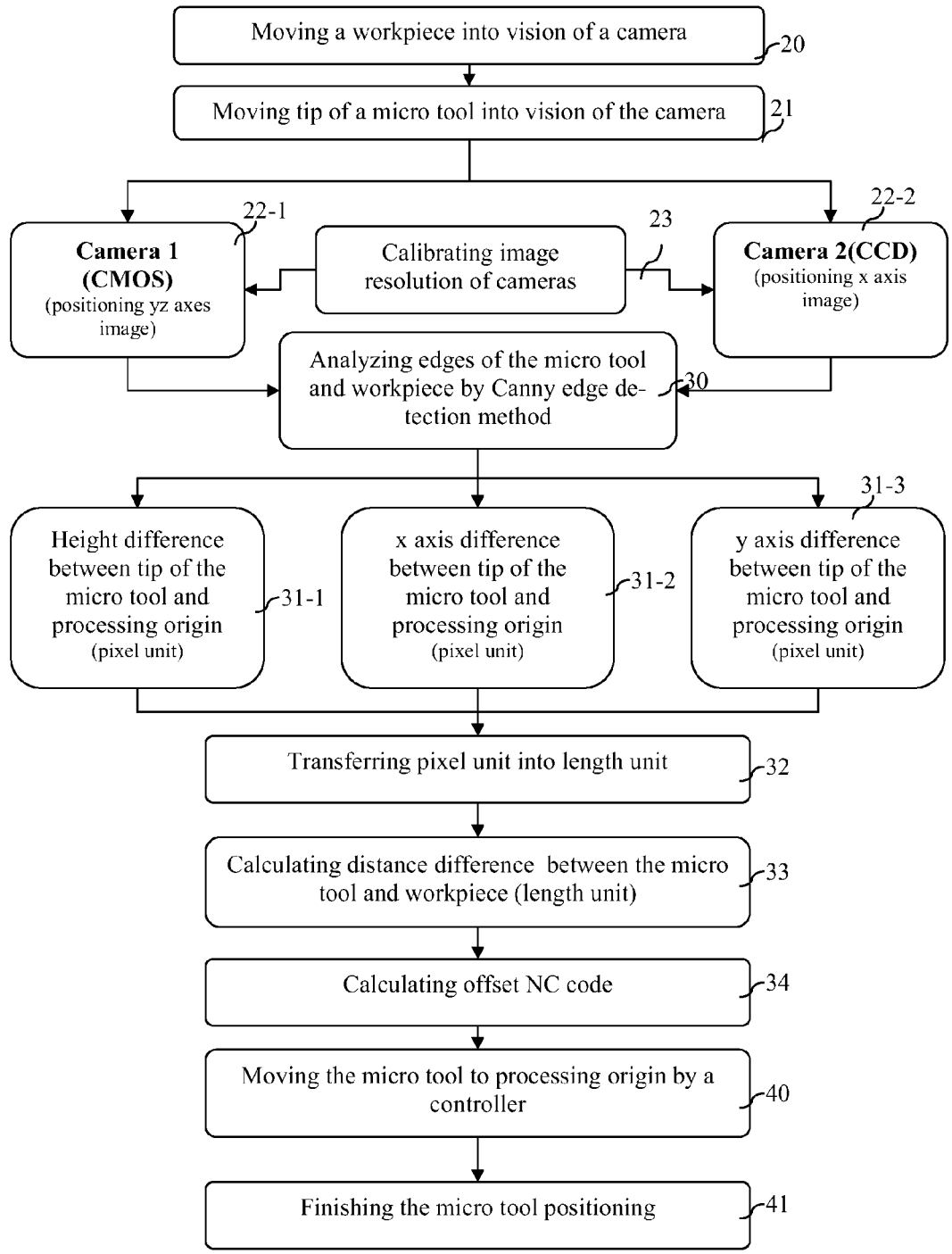
FIG. 2 shows another embodiment flow diagram of a method for positioning a micro tool of a micro machine in accordance with present invention.

Please refer to FIG. 2, the workpiece is moved into camera, i.e., vision of the stereo image-capturing device (step 20). Then, tip of the micro tool is moved into vision of the camera (step 21). A first camera, which can be a COMS digital camera, will capture y and z axes images of the micro tool and the workpiece, and a second camera, which can be a CCD digital camera, will capture x axis image thereof first camera, which can be a COMS digital camera, will capture y and z axes images of the micro tool and the workpiece, and a second camera, which can be a CCD digital camera, will capture x axis image thereof first camera, which can be a COMS digital camera, will capture y and z axes images of the micro tool and the workpiece, and a second camera, which can be a CCD digital camera, will capture x axis image thereof first camera, which can be a COMS digital camera, will capture y and z axes images of the micro tool and the workpiece, and a second camera, which can be a CCD digital camera, will capture x axis image thereof first camera, which can be a COMS digital camera, will capture y and z axes images of the micro tool and the workpiece, and a second camera, which can be a CCD digital camera, will capture x axis image thereof first camera, which can be a COMS digital camera, will capture y and z axes images of the micro tool and the workpiece (step 22-1), which can be a CCD digital camera, will capture x axis image thereof (step 22-1). In the meantime, the first and second cameras perform calibration to figure out resolution (step 23). Then, the images captured by the first and second cameras are analyzed by Canny edge detection method to obtain edges of the micro tool and workpiece (step 30).

An edge is the most significant variant portion of a localized grey image. An edge exists between different targets, target and background, and area and area (including different hues), which is an important base for image separation, texture feature and shape feature of image analysis. And edge detection not only analyzes size and direction of an article in images, but also acquires and classifies specific articles from images. The edge detection method includes four steps: image filtering, enhancement of edge, analysis of edge, and location of edge. These steps are set forth below.

Nowadays image-capturing devices are digital type, such as CCD or CMOS. And, digital photo-sensors are affected by intrinsic current, exposure duration, sensitization setup, and diaphragm, and noises, except subject article, are generated in the images. It is the most used method in image filtering by using a filter to lower grey level of the noise. A filter is a set of mask (odd sides square) and function, which applies the mask to image in order to redefine a new image, in which pixel grey levels of the new image are obtained by performing convolution integral according to mask function and original grey levels (original image grey levels). For example, a mask M with 3×3 pixel size with a grey level P(i, j) before filtering coordinate (i, j), has a filtered grey level P'(i, j), described as $$P'(i, j) = \sum_{x=-1}^{1} \sum_{y=-1}^{1} m(x, y) p(i+y, j+x)$$
$$= M \times P$$

wherein x, y are function coordinates in the mask;

m(x, y) is function values of the mask, and would be different according to different masks;

p(i+y, j+x) is original grey level.

Then, a first order or second order partial derivative is performed to calculate gradient, and this gradient will represent grey level variation next to neighbor pixel, called edge enhancement. After edge enhancement, in order to affirm which pixel is edge, an edge analysis is performed to determine it. The simplest edge analysis method is gradient threshold value determination method; a pixel is determined as edge while a gradient value exceeds set threshold value, and not while below. If a pixel is determined as edge, pixel coordinate of an image denotes its location.

In image processing method, Sobel, Laplace of Guassian, and Canny edge detection methods are common used. Sobel and Laplace of Gaussian edge detection methods utilize partial derivative calculus to figure out gradient, and whether a pixel can be determined as edge accords to a threshold value. However, only gradient included to determine if a pixel is edge will generate multiple discontinuity edge, and this will harmful locate article's profile. And, Canny edge detection method, combines Gaussian filter function and Sobel partial derivative of directive advantage, with dual threshold value determination method to connect discontinuity edge. Canny edge detection method has advantage on obtaining finest edge of an article in an image.

Sobel edge detection method adopts first order partial derivative calculus to figure out pixel gradient. Because of first partial derivative calculus appeared a vector, filter of Sobel edge detection method has directive gradient features. Sobel filter includes two filters, in which one is a horizontal filter and the other is a vertical filter, denoted as Sx and Sy respectively, with expressions:

$$S_x = \begin{bmatrix} -1 & 0 & 1 \\ -2 & 0 & 2 \\ -1 & 0 & 1 \end{bmatrix}$$

After a convolution integral is performed with Sx and Sy filters, coordinates (i, j) in an image has gradient components Ex(i, j), Ey(i, j) along x, y direction, which are $$E_x(i, j) = |S_x * P|$$
$$E_y(i, j) = |S_y * P|$$

wherein $$P = \begin{bmatrix} a_1 & a_2 & a_3 \\ a_8 & I(i,j) & a_4 \\ a_7 & a_6 & a_5 \end{bmatrix}$$

P is the original grey levels to the filter mask, I(i, j) is the original grey levels of coordinate (i, j), and $a_1$ to $a_8$ are original grey levels next to the neighbors.

If both Ex(i, j) and Ey(i,j) are zero, it means no grey level variation next to its neighbor. If grey levels of four directions are different, operation value of Ex(i, j) and Ey(i,j) are not zero.

Gradient quantity and orientation of the coordinate (i,j) via Sobel filter operation is $$M(i,j) = \sqrt{E_x(i,j)^2 + E_y(i,j)^2}$$
$$\theta = \operatorname{Tan}^{-1}\left(\frac{E_y(i,j)}{E_x(i,j)}\right).$$

And threshold value is used to determine whether a pixel is an edge. When a predetermined gradient threshold value is T, and if M(i,j)>T or M(i,j)=T, the coordinate (i, j) is edge; if M(i,j)<T, the coordinate (i, j) is not edge. Usually, gradient threshold value T is set to clearly differentiate article's profile.

Canny sets up three purposes in edge detection in 1986 as:
1. lowering detection error: by increasing SN (signal-to-Noise) to remove noise such that the best edge of article detection can be achieved;
2. better positioning: detected edge very close to real article's edge; that means the smaller difference between real edge and detected edge is, the better positioning;
3. suppression edge with multi pixel: additional condition added by Canny, that pixel gradient on suppression direction must be local maximum to thinner edge of analyzed article in image processing. Canny edge detection method includes four parts: Gaussian filters, calculating gradient quantity and direction of coordinate (i, j) after Gaussian filter by using Sobel filter, performing NMS (Non-maxima suppression), and dual threshold values T1 and T2 to analyze if a pixel is edge. These four steps are described below. Noises in an image are removed by using Gaussian filter, wherein the Gaussian filter is:

$$G(x, y, \sigma) = \frac{1}{\sqrt{2\pi\sigma}} e^{-(x^2+y^2)/2\sigma^2}$$

wherein σ is standard deviation of the Gaussian filter, x, y are mask function coordinates.

After the Gaussian filter, the coordinate (i, j) in the image will have grey level as, $$S(i,j) = G(x,y;\sigma) * I(i,j)$$

wherein
S(i, j) is grey level after Gaussian filter,
I(i, j) is grey level before Gaussian filter.

The standard deviation is a setup value in the mask function. The more σ is, the more capability of removing noise, but grey level of edge may be lightened. On the contrary, although the less σ may preserve more edge information, noise can be survived also. Therefore, before using Gaussian filter, a suitable standard deviation should be setup. Generally, while filtered article profile is clear and edge line is smooth, a suitable standard deviation is prepared. Then, a first partial derivative is performed to calculate quantity and direction of gradient. In this invention, Sobel filter is used to calculate quantity and direction of gradient of coordinate (i, j) after Gaussian filter.

Then, NMS is performed. Quantity and direction of gradient of every pixel in the image can be obtained after former step. Suppression direction can be calculated by using direction of gradient, and quantity of gradient is compared to preserve local maxima and delete non-maxima gradient value. Suppression direction should be calculated before NMS is performed. Suppression direction of coordinate (i, j), ζ(i, j)(sector value), can be obtained by using the direction of gradient calculated in the former step. The definition of suppression direction is:

$$\zeta(i,j) = \begin{cases} 0 & \text{if } \theta \in [-22.5° \quad 22.5°] \quad \text{or } [157.5° \quad 202.5°] \\ 1 & \text{if } \theta \in [22.5° \quad 67.5°] \quad \text{or } [202.5° \quad 247.5°] \\ 2 & \text{if } \theta \in [67.5° \quad 112.5°] \quad \text{or } [247.5° \quad 292.5°] \\ 3 & \text{if } \theta \in [112.5° \quad 157.5°] \quad \text{or } [292.5° \quad -22.5°] \end{cases}$$

wherein,
θ is gradient direction of coordinate (i, j).
When value of ζ(i, j) is 1, localized maxima between central point coordinate (i, j) and the 1 direction coordinate ((i−1, j+1) and (i+1, j−1) respectively) are compared. If M(i, j) is larger than M(i−1, j+1) as well as M(i+1, j−1), M(i, j) is preserved, or else M(i,j) is zero.
NMS expression is:

$$N(i,j) = nms(M(i,j), \zeta(i,j))$$

wherein M(i, j) is gradient of coordinate (i, j).
If M(i, j) is localized maximum in suppression direction, N(i, j)=M(i, j), or else M(i, j)=0.
Then, dual threshold values T1 and T2 are used to analyze if the pixel is edge, wherein T1>T2, T1=2×T2. The dual threshold values determination rule is: (1) if gradient is larger than T1, the pixel is edge; if gradient is less than T2, the pixel is not edge; (2) if gradient less than T1 and larger than T2, and if gradient of neighbor pixel larger than T1, this neighbor pixel is edge. Advantage of the dual threshold values is to avoid discontinuity in edge.

Next, height difference between tip of the micro tool and original processing point of the workpiece is calculated (step 31-1), wherein unit of height difference is pixel. Further, horizontal distance between tip of the micro tool and original processing point of the workpiece is calculated, including pixel difference along y axis (step 31-2) and pixel difference along x axis (step 31-3). Result of step 31 can be transformed from pixel unit into length unit (step 32). Then, distance difference between the micro tool and processing location of the workpiece is calculated, that is the micro tool error (step 33). And then the calculated result is transferred into NC code, and NC code offset value is calculated (step 34). The micro tool is then moved to the processing origin on the workpiece by a controller (step 40). Then a positioning step is finished (step 41).

Figure 3:
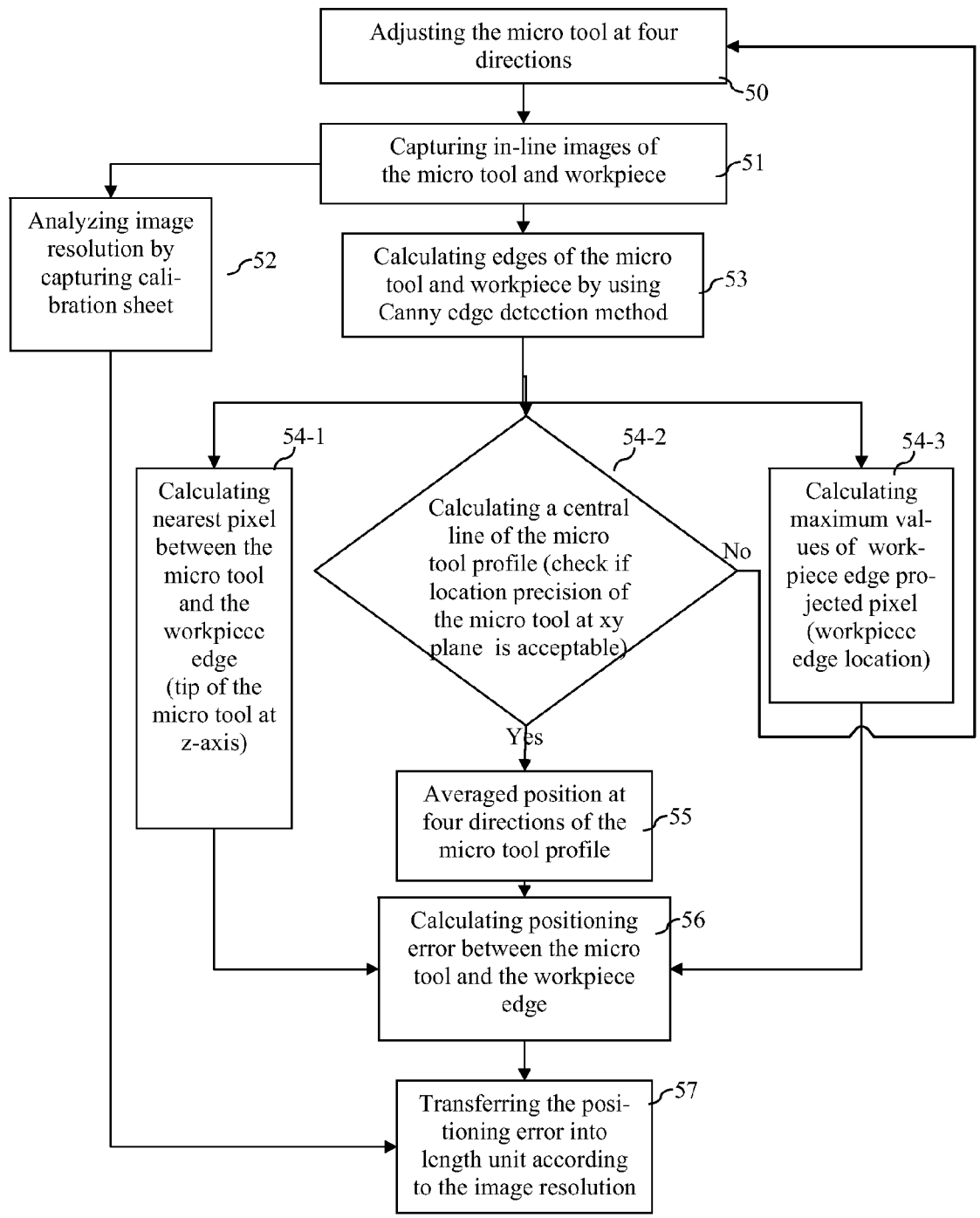
FIG. 3 shows a flow diagram of calculating center point of the micro tool and border of a workpiece in accordance with present invention.

The detail procedure of positioning the micro tool can be referred to FIG. 3. First, the micro tool is adjusted to four directions (0°, 90°, 180°, 270° (step 50). Images of the micro tool and workpiece at the four directions are captured (step 51). A calibration slice is captured to obtain resolution of an image (step 52). The object of step 52 is to provide a base from pixel unit into length unit. Canny edge detection method is then performed to calculated micro tool profile and workpiece edge (step 54). Next, the nearest pixel of the workpiece edge to tip of the micro tool is figured (step 54-1); that is tip of the micro tool at z-axis location. A central line of the micro tool edge profile is calculated (step 54-2); that is center point of the micro tool at x-y plane location, which can also be referred to lines 61 and 63 in FIG. 4. Further, maximum values of workpiece edge pixel, location of workpiece edge, are calculated, which can be referred to lines 62 and 54 in FIG. 4. When positioning result is not within an acceptable range, that is result of step 54-2 does not meet precision requirement, step 50 is performed again to relocate four directions of the micro tool. When positioning result is within an acceptable range, average of profile central position of four directions of the micro tool is calculated (step 55). Positioning error between the micro tool and workpiece is then calculated with results of step 54-1 and step 54-3, wherein unit of the positioning error is pixel. According to result of step 52, length of positioning error is calculated in compliance with resolution (step 57).

This invention also provides a micro tool positioning system in accordance with the above described positioning method. Please refer to FIG. 5, in which a micro tool positioning system for micro machine is shown, which comprises a micro machine 110, a stereo image-capturing device 120, image analysis system 130, and a controller 140.

Figure 5:
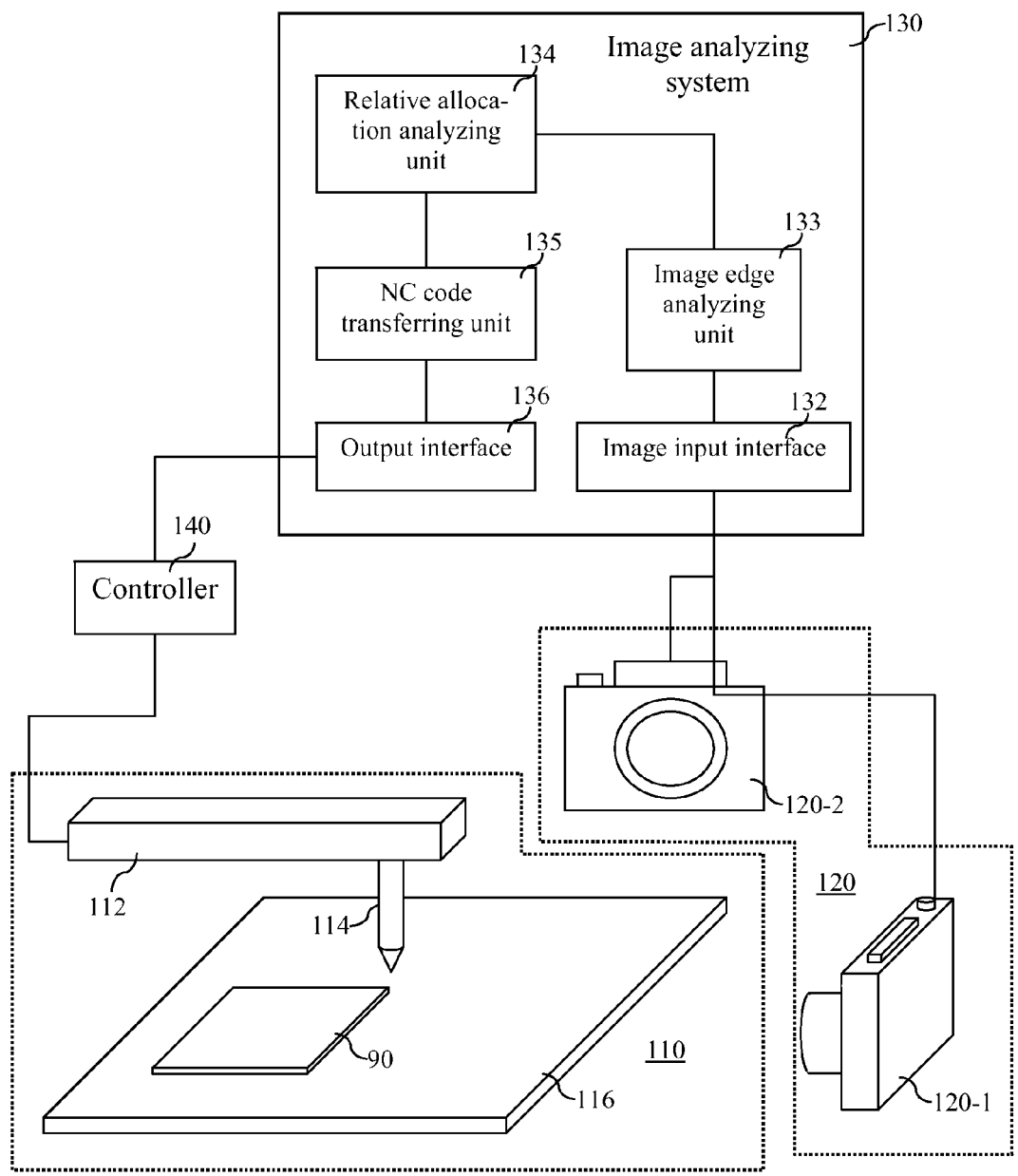
FIG. 5 shows a schematic diagram illustrating a positioning system in accordance with present invention.

The micro machine 110 includes a robot arm 112, a micro tool 114 on the robot arm 112, and a platform 116. the platform 116 in FIG. 5 has a workpiece 90 to be processed by the micro tool 114. The robot arm 112 can be moved at horizontal and vertical directions, and provides the micro tool 114 to a predetermined position. In this invention, a toggle-type machine can be applied.

The stereo image-capturing device 120 includes at least a first image-capturing device 120-1 and a second image-capturing device 120-2, which can capture images of the micro tool 114 and workpiece 90 from different angles and positions, and output to the image analyzing system 130. The stereo image-capturing device 120 may include two or more than two image-capturing devices to provide more accurate image analysis. In this embodiment, two image-capturing devices can satisfy majority accuracy requirement. Image-capturing devices can be CCD or CMOS cameras, SLR or TLR cameras, or digital video cameras. In this invention, any digital camera or digital video camera can be applied. In this embodiment, the first image-capturing device 120-1 uses CMOS digital camera to capture images of the micro tool and workpiece at y and z axes, and the second image-capturing device 120-2 uses CCD digital camera to capture images of the micro tool and workpiece at x axis.

The image analysis system 130 includes an image input interface 132, image edge analysis unit 133, relative position analysis unit 134, NC code transferring unit 135, and output interface 136. The image analysis system 130 performs micro tool positioning method of this invention, which can be referred to FIG. 3. First, the micro tool is adjusted to four directions (0°, 90°, 180°, 270°) (step 50). Images of the micro tool and workpiece at the four directions are captured (step 51). A calibration slice is captured to obtain resolution of an image (step 52). The object of step 52 is to provide a base from pixel unit into length unit. Canny edge detection method is then performed to calculated micro tool profile and workpiece edge (step 54). Next, the nearest pixel of the workpiece edge to tip of the micro tool is figured (step 54-1); that is tip of the micro tool at z-axis location. A central line of the micro tool edge profile is calculated (step 54-2); that is center point of the micro tool at x-y plane location, which can also be referred to lines 61 and 63 in FIG. 4. Further, maximum values of workpiece edge pixel, location of workpiece edge, are calculated, which can be referred to lines 62 and 54 in FIG. 4. When positioning result is not within an acceptable range, that is result of step 54-2 does not meet precision requirement, step 50 is performed again to relocate four directions of the micro tool. When positioning result is within an acceptable range, average of profile central position of four directions of the micro tool is calculated (step 55). Positioning error between the micro tool and workpiece is then calculated with results of step 54-1 and step 54-3, wherein unit of the positioning error is pixel. According to result of step 52, length of positioning error is calculated in compliance with resolution (step 57).

The flow procedure of positioning method in FIG. 3, the positioning step locates the micro tool 140 to processing original point on a separate horizontal image (x axis and y axis) and a height image (z axis) which are captured by using the stereo image-capturing device 120, separate TLR cameras in this embodiment. To the workpiece 90 edge detection, images are captured by the stereo image-capturing device 120 and analyzed by the Canny edge detection method to obtain the micro tool 114 edge and the workpiece 90 edge. Due to effect of the workpiece 90 surface, the workpiece 90 edges fluctuate and hard to be recognized. Hence, an image projection technique is applied to the workpiece 90 edge, and maximum values on the projected image in pixel coordinate frame defines as the workpiece 90 edge locations. The workpiece 90 edge and the micro tool 114 are moved into vision of the stereo image-capturing device 120, and the workpiece 90 edge locations and tip location as well as central point of the micro tool 114 are captured by the stereo image-capturing device 120. Position differences (pixel unit) between workpiece 90 edge and tip as well as central point of the micro tool 114 are then calculated. After pixel unit is transferred by image resolution, distance differences (x, y, z coordinate differences between the micro tool 114 and the workpiece 90 processing origin) between workpiece 90 edge and tip (protrusion point) of the micro tool 114 can be calculated. Height and position of the micro tool 114 can be adjusted then to put it to the workpiece 90 processing origin. The micro tool positioning error includes two parts; one is workpiece edge detection and the other one is detection of tip as well as central point of the micro tool.

In machine vision system, image projection technique is applied widely to edge detection. For binary values image, images that are projected directly to vertical or horizontal axes can gather statistics pixel numbers of different locations on the projected axis. For example, pixel projected on image of horizontal axis can accumulate pixel numbers on the projected direction (vertical axis).

For the binary values, image along rows is projected, and H[i] is projected along columns to V[j], which can be expressed as $$H[i] = \sum_{j=1}^{m} B[i, j]$$

$$V[j] = \sum_{i=1}^{m} B[i, j]$$

Figure 4:
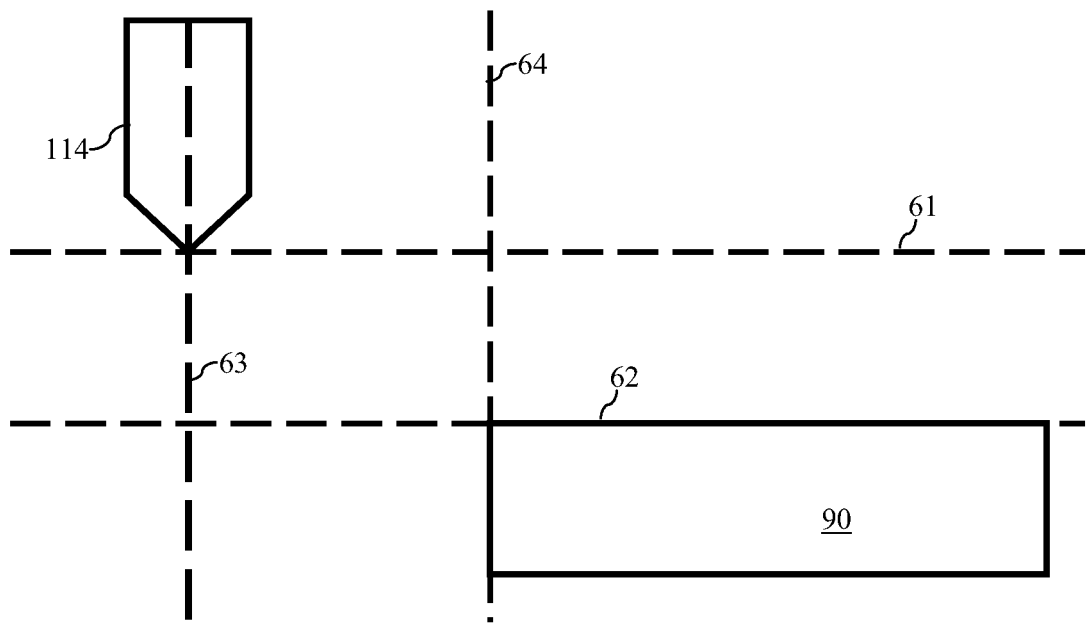
FIG. 4 shows a schematic diagram illustrating a result of calculating center point of the micro tool and border of the workpiece in accordance with present invention.

The workpiece 90 edge defined by image projection is horizontal 62 on x axis on and 64 on y axis, as shown in FIG. 4.

On detection of tip as well as central point of the micro tool 114, after the stereo image-capturing device 120 capture images on yz axes (by the first image-capturing device 120-1) and x axis (by the second image-capturing device 120-2), the micro tool 114 edge can be obtained by using Canny edge detection method, and the micro tool 114 profile edge pixels are calculated. Then, the nearest pixel location on the workpiece 90 edge axis to tip of the micro tool 114 is calculated, and height (z direction) location of tip of the micro tool 114 can be defined according to the nearest pixel location.

On detection of central point of the micro tool 114, the first image-capturing device 120-1 and the second image-capturing device 120-2 capture x-axis image and y-axis image respectively. As shown in FIG. 4, tip of the micro tool 114 is defined on 61 of x-axis and 63 of y-axis plane. Profile center location of the micro tool profile edge pixel is calculated, and this center location is defined as central point of the micro tool, such that central point of the micro tool can be defined on the x-y plane. High speed main axis may induce run out while rotating because of assembling or wearing. Furthermore, on the manufacturing micro tool, edge and hilt of the micro tool may have bias or deflection errors, such that micro tool will at different rotation directions may induce different positioning results, and the micro tool positioning accuracy is affected. Therefore, on detection of central point of the micro tool, in order to detect centre point of the micro tool exactly, four directions (0°, 90°, 180°, 270°) images of the micro tool are captured. Center points of the micro tools to every images are averaged to obtain center point of the micro tool in processing when the micro tool is rotating.

Data captured by the stereo image-capturing device 120 can be output by memory card, USB, IEEE 1394, RS 232, printer port, wireless transfer, or particular specification to the image analysis system. Specifications of the memory card can be referred to commercialized memory card, such as CF, SD/MMC, MS, Smart card. However, when in-line inspection is needed, high speed real-time transferring, such as USB and IEE 1394, would be preferred. In this embodiment, the image transferring interface 132 uses USB.

Then, images are transferred into edge analysis unit 133. The transferred images are analyzed edges, which includes image filtering step, edge enhancing step, edge analyzing step, and edge positioning step. The image filtering step is to remove noise in the captured image. The edge enhancing step is to calculate gradient by using first or second order partial derivative, and to represent grey level variation of neighbor to a pixel by the gradient. After the edge enhancing step, in order to assure which pixel is edge, edge analyzing step is performed. The simplest edge analyzing method is threshold value determination; when gradient larger than the threshold value, the pixel is edge, not on the opposite. If a pixel is determined as edge, pixel coordinate on this image is denoted. Then, the Canny edge detection method is applied to determine edge. Detailed procedures can be referred to step 30 in FIG. 2.

The analyzed edge images will be transferred to relative allocation analyzing unit 134. Edges from the image edge analyzing unit 133 are calculated to relative position between tip of the micro tool 114 and the workpiece 90 in the relative allocation analyzing unit 134, wherein relative unit is pixel. Detailed relative allocation analyzing procedures can be referred to step 31-1, step 31-2, step 31-3 in FIG. 2, step 54-1, step 54-2, step 54-3, step 55, step 56 in FIG. 3, and FIG. 4. Then, pixel unit is transferred to length unit. Detailed procedures can be referred to step 32 in FIG. 2, step 52 and step 57 in FIG. 3.

Next, the transferred length unit of the relative distance is transferred into NC code transferring unit 135 to NC code. The NC code is then transferred to the controller 140 via output interface 136. the output interface 136, like input interface 132, can be USB, IEEE 1394, RS 232, printer port, wireless transferring, or particular specifications. In this embodiment, USB interface is applied.

Figure 6:
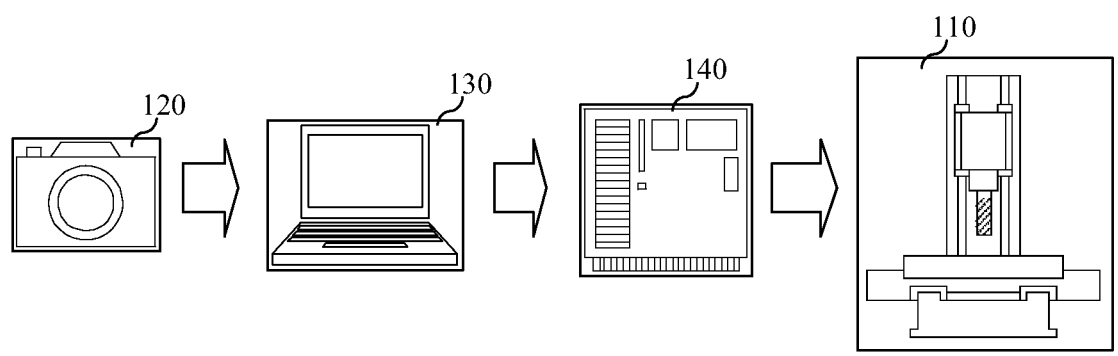
FIG. 6 shows a schematic diagram illustrating equipment structure of a positioning system in accordance with present invention.

The automatic micro tool positioning system of this invention utilizes separate TLR cameras to capture real-time images, wherein camera 1 equips to front side of the micro machine (yz plane), and camera 2 equips to lateral side of the micro machine (xz plane). With in-line precise micro tool positioning system to allocate micro tool error, offset values of the micro tool inspected by the system can be output as .txt format NC code, and the micro tool positioning error can be corrected. Because controller is a PC-base, controller can be connected to a computer, and complied micro tool positioning NC program of this inspection system can be put to the controller. NC program can be executed to position the micro tool directly. FIG. 6 illustrates a schematic diagram illustrating equipment structure of a positioning system in accordance with present invention. Images are captured by the image-capturing device 120 and transferred to the image analyzing system 130. In this embodiment, all systems are formulated as programs to analyze images and output to NC code, and hence a lap-top computer is represented in FIG. 6. The NC code is then output to the PC-based controller 140, wherein the controller 140 can move the micro tool directly to allocated position.

When the micro tool positioning system is performed automatically, because machine per se has servo error, the micro tool still exits positioning error. Therefore, after the first positioning procedure, three axes of the positioned micro tool needs to be inspected again. If the micro tool still exits positioning error, another positioning the micro tool should be performed again until an exact result is acceptable. The automatic micro tool positioning operating procedure is shown in FIG. 7.

Figure 7:
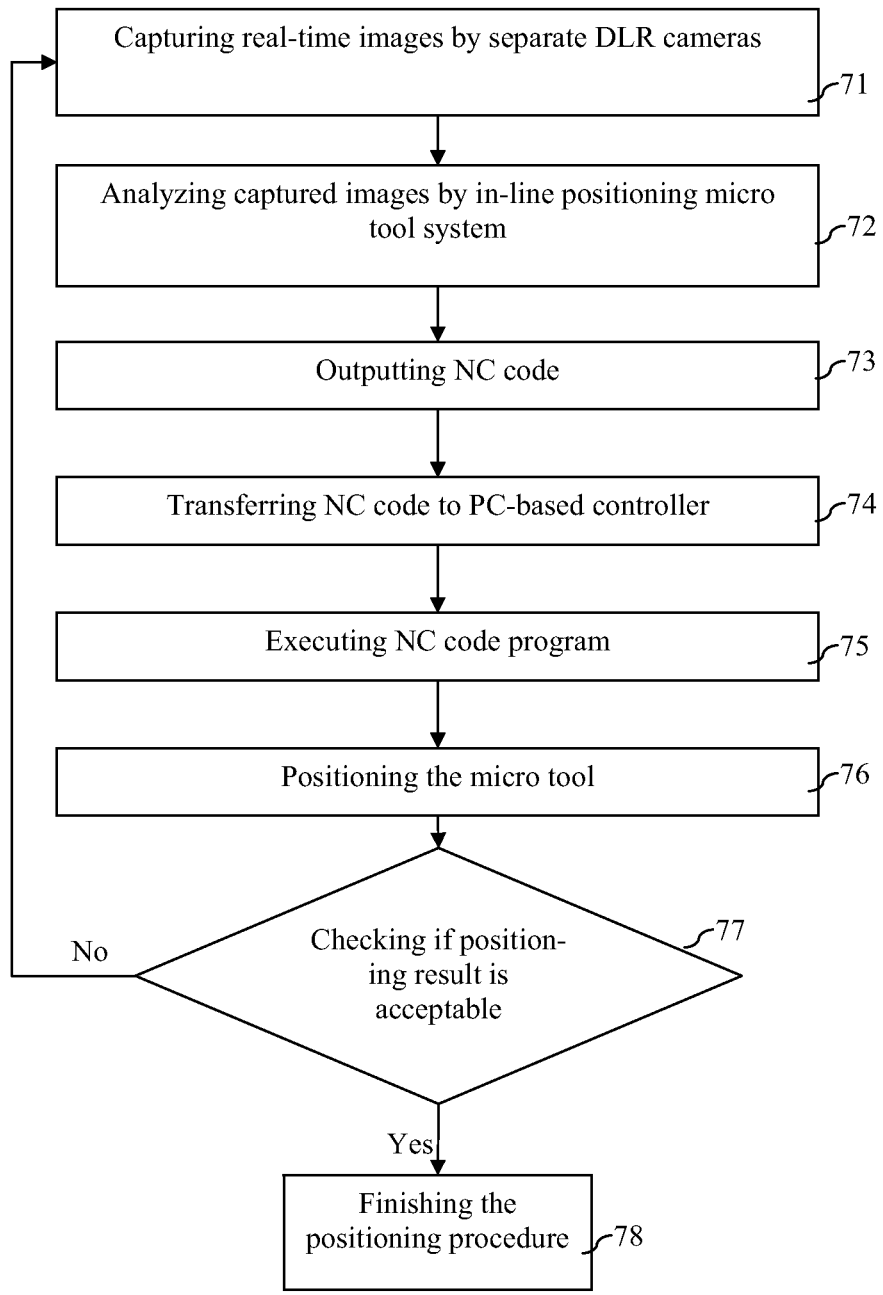
FIG. 7 shows a flow diagram operating positioning equipment of FIG. 6 of the present invention.

Please refer to FIG. 7, images are captured first by separate DLR cameras (step 71). The micro tool position is obtained by using in-line positioning system to analyze the images (step 72). Then, location of the micro tool is output as NC code (step 73). The NC code is input into PC-based controller (step 74), and executed (step 75). The micro tool is the positioned (step 76). At this time, the micro tool is inspected too check if the result is acceptable (step 77). If result is not acceptable, step 71 is performed again; if result is acceptable, the micro tool positioning procedure is finished (step 78).

An advantage of non-contact positioning procedure can be achieved by using this invention, that's because image analyzing method is provided to this invention to allocate the micro tool. There is no necessary to use probe of offset, because spot light is the positions of the micro tool and workpiece. Further, inspection speed is fast without using probe to contact micro tool. Inspection and detection are performed by using computer and fast enough as a real-time inspection. Moreover, soft tool, thinner tool, or not contactable tool can be detected positions without any limitation on size and shape.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A system for positioning micro tool of a micro machine, comprising:
   a micro machine, including:
      a micro tool for processing a precision working to a workpiece;
      a platform for providing a base to processing said workpiece; and
      a precision arm for controlling a position of said micro tool;
   a first image capturing device and a second image capturing device, respectively mounted at two sides of said micro machine, for capturing horizontal and vertical images of said micro tool and said workpiece, wherein said two sides are perpendicular to each other;
   a positioning device, comprising:
      an image input interface for receiving said horizontal and vertical images of said micro tool and said workpiece captured by said first image capturing device and said second image capturing device;
      an image edge analysis unit, coupled to said image input interface, for applying an image edge manner to analyze borders of said horizontal and vertical images of said micro tool and said workpiece into border horizontal and vertical images of said micro tool and said workpiece;
      a relative position analysis unit, coupled to said image edge analysis unit, for applying an analyzing relative allocation manner to analyze said border horizontal and vertical images of said micro tool and said workpiece into location discrepancies of said micro tool and said workpiece;
      a code transferring unit, coupled to said relative position analysis unit, for converting said location discrepancies to a code; and
      an output interface for transferring out said code; and
   a controller for receiving said code to position said micro tool into precise location;
   wherein said analyzing image edge manner comprises:
      removing noise from the said horizontal and vertical images of said micro tool and said workpiece;
      calculating a gradient representing a grey level variation of neighbor to a pixel in said horizontal or vertical images by using a first or second order partial derivative;
      assuring which pixel is edge; and
      denoting a pixel coordinate on said horizontal or vertical images if the pixel is determined as edge
   wherein said analyzing relative allocation manner comprises:
      calculating vertical pixel discrepancy of said micro tool tip to a processing point of the workpiece;
      calculating horizontal pixel discrepancy of said micro tool center point to the processing point of the workpiece;
      calculating average of profile central position according to said horizontal and vertical images of said micro tool with said different adjusted directions; and
      transferring pixel unit of said vertical and horizontal pixel discrepancies into length unit to obtain locational discrepancies from said micro tool to the workpiece.

2. The system for positioning micro tool of said micro machine according to claim 1, wherein said analyzing image edge manner is Sobel edge detection method, Laplace of Gaussian edge detection method, or Canny edge detection method.

3. The system for positioning micro tool of said micro machine according to claim 1, wherein said analyzing image edge manner uses Canny algorithm to calculate edge of said micro tool and said workpiece.

4. The system for positioning micro tool of said micro machine according to claim 3, wherein resolutions of said first and second image capturing devices are calibrated before capturing said horizontal and vertical images.

5. A positioning system, comprising:
   a micro machine, including:
      a micro tool for processing a precision working to a workpiece;
      a platform for providing a base to processing said workpiece; and
      a precision arm for controlling a position of said micro tool;
   a stereo image capturing device for capturing stereo images of said micro tool and said workpiece, wherein said micro tool is adjusted according to directions and said stereo image capturing device captures said stereo images of said micro tool according to different adjusted directions;
   a positioning device, including:
      an image input interface for receiving said stereo images of said micro tool and said workpiece;
      an image edge analysis unit, coupled to said image input interface, for applying an image edge manner to analyze borders of said stereo images of said micro tool and said workpiece into border images of said micro tool and said workpiece;
      a relative position analysis unit, coupled to said image edge analysis unit, for applying an analyzing relative allocation manner to analyze said border images of said micro tool and said workpiece into location discrepancies of said micro tool and said workpiece;
      a code transferring unit, coupled to said relative position analysis unit, for converting said location discrepancies to a code; and
      an output interface for transferring out said code; and
   a controller for receiving said code to position said micro tool into precise location;
   wherein said analyzing image edge manner comprises:
      removing noise from the said stereo images of said micro tool and said workpiece;

calculating a gradient representing a grey level variation of neighbor to a pixel in said stereo images by using a first or second order partial derivative;

assuring which pixel is edge; and denoting a pixel coordinate on said stereo images if the pixel is determined as edge;

wherein said analyzing relative allocation manner comprises:

calculating vertical pixel discrepancy of said micro tool tip to a processing point of the workpiece;

calculating horizontal pixel discrepancy of said micro tool center point to the processing point of the workpiece;

calculating average of profile central position according to said stereo images of said micro tool with said different adjusted directions; and transferring pixel unit of said vertical and horizontal pixel discrepancies into length unit to obtain locational discrepancies from said micro tool to the workpiece.

6. The positioning system according to claim 5, wherein said analyzing image edge manner is Sobel edge detection method, Laplace of Gaussian edge detection method, or Canny edge detection method.

7. The positioning system according to claim 5, wherein said analyzing image edge manner uses Canny algorithm to calculate edge of said micro tool and said workpiece.

8. The positioning system according to claim 5, wherein said stereo image capturing device comprises a first image capturing device and a second image capturing device.

9. The positioning system according to claim 8, wherein said stereo images include horizontal and vertical images.

10. The positioning system according to claim 7, wherein resolutions of said first and second image capturing devices are calibrated before capturing said horizontal and vertical images.

11. A positioning method, comprising:

providing a stereo image capturing device;

providing a tip of a micro tool and a workpiece into a vision of said stereo image capturing device;

capturing stereo images of said micro tool and said workpiece by using said stereo image capturing device, wherein said micro tool is adjusted according to directions and said stereo image capturing device captures said stereo images of said micro tool according to different adjusted directions;

analyzing borders in said stereo images of said micro tool and said workpiece;

calculating positions of said micro tool and said workpiece according to said borders in said stereo images of said micro tool and said workpiece;

calculating a deviation of said micro tool; and positioning said micro tool;

wherein said step of analyzing borders in said stereo images of said micro tool and said workpiece comprises:

removing noise from the said stereo images of said micro tool and said workpiece;

calculating a gradient representing a grey level variation of neighbor to a pixel in said stereo images by using a first or second order partial derivative;

assuring which pixel is edge; and denoting a pixel coordinate on said stereo images if the pixel is determined as edge;

wherein said step of calculating said positions of said micro tool and said workpiece comprises:

calculating vertical pixel discrepancy of said micro tool tip to a processing point of the workpiece;

calculating horizontal pixel discrepancy of said micro tool center point to the processing point of the workpiece;

calculating average of profile central position according to said stereo images of said micro tool with said different adjusted directions;

wherein said step of calculating said deviation of said micro tool comprises:

transferring pixel unit of said vertical and horizontal pixel discrepancies into length unit to obtain locational discrepancies from said micro tool to the workpiece wherein said step of positioning said micro tool comprises:

converting said location discrepancies to a code so as to position said micro tool into precise location by said code.

12. The positioning method according to claim 11, wherein said stereo image capturing device comprises a first image capturing device and a second image capturing device for capturing horizontal and vertical images of said micro tool and said workpiece.

13. The positioning method according to claim 12, wherein said first image capturing device and said second image capturing device are CCD or CMOS digital cameras.

14. The positioning method according to claim 13, further comprising a step of calibrating resolution of said first image capturing device and said second image capturing device.

15. The positioning method according to claim 14, wherein said step of analyzing said borders in said stereo images of said micro tool and said workpiece comprises Sobel edge detection method, Laplace of Gaussian edge detection method, or Canny edge detection method.

16. The positioning method according to claim 14, wherein said step of analyzing said borders in said stereo images of said micro tool and said workpiece is Canny edge detection method.

17. A position deviation detecting method for micro tool of a micro machine, comprising:

providing a stereo image capturing device;

providing a tip of said micro tool and a workpiece into a vision of said stereo image capturing device;

capturing images of said micro tool and said workpiece by using said stereo image capturing device;

analyzing borders in said images of said micro tool and said workpiece;

calculating positions of said micro tool and said workpiece according to said borders in said images of said micro tool and said workpiece; and calculating a deviation of said micro tool so as to obtain locational discrepancies from said micro tool to the workpiece;

wherein said stereo image capturing device comprises a first image capturing device and a second image capturing device for capturing horizontal and vertical images of said micro tool and said workpiece;

wherein said step of analyzing borders in said images of said micro tool and said workpiece comprises:

removing noise from the said horizontal and vertical images of said micro tool and said workpiece;

calculating a gradient representing a grey level variation of neighbor to a pixel in said horizontal or vertical images by using a first or second order partial derivative;

assuring which pixel is edge; and denoting a pixel coordinate on said horizontal or vertical images if the pixel is determined as edge;

wherein said step of calculating said positions of said micro tool and said workpiece comprises:
  calculating vertical pixel discrepancy of said micro tool tip to a processing point of the workpiece;
  calculating horizontal pixel discrepancy of said micro tool center point to the processing point of the workpiece; and
  calculating average of profile central position according to said horizontal and vertical images of said micro tool with said different adjusted directions;
wherein said step of calculating said deviation of said micro tool comprises:
  transferring pixel unit of said vertical and horizontal pixel discrepancies into length unit to obtain locational discrepancies from said micro tool to the workpiece;
wherein said position deviation detecting method for micro tool of a micro machine further comprises:
  converting said locational discrepancies to a code so as to position said micro tool into precise location by said code.

18. The position deviation detecting method for micro tool of said micro machine according to claim 17, wherein said first image capturing device and said second image capturing device are CCD or CMOS digital cameras.

19. The position deviation detecting method for micro tool of said micro machine according to claim 18, further comprising a step of calibrating resolution of said first image capturing device and said second image capturing device.

20. The position deviation detecting method for micro tool of said micro machine according to claim 19, wherein said step of analyzing said borders in said images of said micro tool and said workpiece comprises Sobel edge detection method, Laplace of Gaussian edge detection method, or Canny edge detection method.

21. The position deviation detecting method for micro tool of said micro machine according to claim 19, wherein said step of analyzing said borders in said images of said micro tool and said workpiece is Canny edge detection method.

* * * * *